Patented Jan. 9, 1934

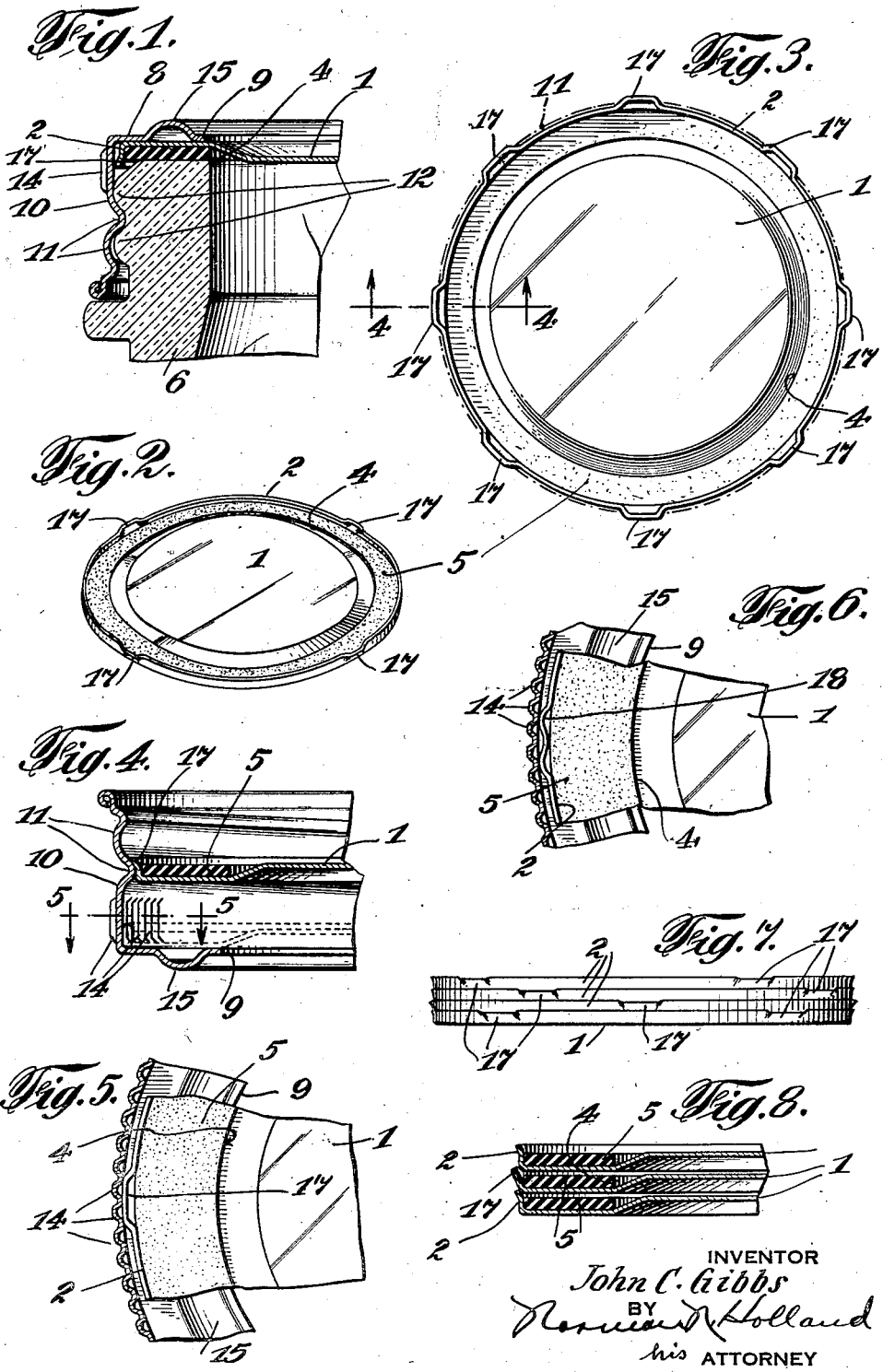

1,942,810

UNITED STATES PATENT OFFICE 1,942,810

TWO-PIECE SCREW CAP

John C. Gibbs, Brooklyn, N. Y., assignor to Anchor Cap & Closure Corporation, Long Island City, N. Y., a corporation of New York Application January 15, 1930. Serial No. 420,857

8 Claims. (Cl. 215—97)

The present invention relates to the sealing art and more particularly to a two-piece screw cap, although certain of its features are applicable to other types of closures.

Screw caps for relatively wide mouthed containers may be constructed from a single piece of metal. Usually, a disc of waxpaper or cardboard is inserted between the cap and the edge of the jar to form a liquid tight seal. The relative thinness of the paper disc and its inelastic properties, together with the slight imperfections in the glass at the mouth of the container, prevent airtight seals with such closures. Such caps have not been successful when rubber gaskets are employed instead of paper liners because the rubber gaskets tend to cement themselves to the glass and it is difficult to remove the cap after it has once been sealed. This is particularly true of packages sealed hot or with a vacuum therein. The latter is necessary with many products and is desirable with many more. To eliminate the difficulty of application and removal of such caps, two-piece screw caps have been provided having a disc plate and a cover cap which is screwed onto the container and usually comprises a cover portion and a depending threaded skirt. In such caps, the liner plate may remain stationary during the screwing and unscrewing operations. There is no necessity for relative movement between the gasket and the mouth of the container because there may be relative movement between the disc member and the screw holding member. The friction between a metal-to-metal contact is relatively small as compared with the friction between glass and rubber. Another advantage of such caps is that the disc member may be vacuum sealed to the container prior to the application of the screw band member or shell which simplifies substantially the type of sealing equipment necessary and increases the speed of sealing. This type of cap, while very desirable in many respects, has certain disadvantages. If two-piece caps are assembled by the cap manufacturer and attempted to be shipped in assembled condition, the disc and holding members become disarranged during shipment and it becomes necessary for the packer to reassemble the parts of the cap. This involves considerable trouble on the part of the packer and an additional expense to the packer which causes complaints. Furthermore, the packer has to assemble the parts manually, whereas the cap manufacturer can afford to have automatic machinery because of the increased number of caps handled. For this reason, manufacturers have assembled the caps and wrapped them in small packages, such as a dozen or more, stacked one upon another, in an effort to prevent the discs from falling out. Even then, the disc plates frequently fell out while the separate packages were being handled by the operators and while the caps were being applied to containers. Other manufacturers shipped the holding members and the disc members separately. In such cases, and in handling the disc members in stacks, the members nested and pressed against the sealing material, causing one cap to adhere to another and making it difficult for an operator to remove the discs one at a time. This difficulty was encountered even when the caps were being assembled by the cap manufacturer because the two parts of the cap have to be manufactured separately and brought together for assembling.

The present invention aims to eliminate or minimize the above difficulties by providing a two-piece closure cap wherein the parts are adapted to co-operate with each other so that the caps may be shipped assembled, thereby relieving the packer of the extra labor of assembling the gaskets and permitting the manufacturer to utilize automatic machinery for this purpose. The invention further contemplates the provision of a disc member for two-piece screw caps and the like, which, when once assembled, will not fall out of the holding member of the cap and, when stacked one upon another, will not nest sufficiently close to cause the sealing material to adhere to adjoining discs.

An object of the present invention is to provide an inexpensive two-piece closure cap adapted to eliminate or minimize the difficulties enumerated above.

Another object of the invention is to provide an effective two-piece screw cap for glass containers, which can be readily assembled and shipped in assembled condition without disarrangement of the parts thereof.

Another object of the invention is to provide a combined disc member and closure cap, the parts thereof being adapted to co-operate with each other to prevent disarrangement during shipment thereof.

Another object of the invention is to centralize the disc members in two piece caps, thereby to improve the seal and to minimize the width of the rubber ring required.

Another object of the invention is to provide a disc member for closure caps adapted to engage and hold itself in position when applied to a holding member.

Another object of the invention is to provide a disc member having sealing material therein which will not stick to another disc when stacked one upon another.

Another object of the invention is to eliminate the adherence of one disc to another when stacked for shipment or for other purposes.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a fragmentary sectional view, with parts in elevation, of a two-piece screw cap sealed upon a container;

Fig. 2 is a perspective view of the disc of the present invention;

Fig. 3 is a plan view of a disc having a different number of lugs about to be applied to a cover cap having a continuous thread;

Fig. 4 is a partial cross-sectional view, taken on the line 4—4 of Fig. 3, showing the disc as it is being inserted in a cover cap;

Fig. 5 is a fragmentary horizontal cross-sectional view, taken on the line 5—5 of Fig. 4, illustrating the lugs of the discs gripping the corrugations of the cover cap;

Fig. 6 is a view similar to Fig. 5, showing another type of lug on the disc;

Fig. 7 is a side elevational view of a stack of discs, illustrating the present invention; and Fig. 8 is an enlarged partial sectional view, illustrating the operation of the lugs in holding the discs apart.

Referring to the drawing, there is shown a two-piece screw cap comprising a disc member 1 having a cover portion and a depending flange 2, with an annular groove 4 adjacent the flange, adapted to receive a gasket 5 or other type of sealing material. The disc member fits over the mouth of a container 6 with the sealing material 5 resting upon the edge or rim of the container to form an edge seal therewith. In order to prevent the disc member from falling off and to hold it rigidly in position, there is provided a screw band member or other suitable holding member which may comprise a cover portion 8, the central part of which is cut away at 9 to minimize the amount of metal used therein. The flange or skirt 10 extends downwardly from the cover portion and has provided therein suitable screw threads 11 adapted to co-operate with the threads 12 on the container for application of the holding member thereto. The upper part of the skirt may be corrugated, as shown at 14, to facilitate application and removal thereof and to improve its appearance. A suitable groove 15 may be provided in the cover portion of the holding member to improve the appearance of the assembled cap and of the resulting package. Heretofore, such caps and discs could not be made to remain in assembled position. The present invention contemplates the provision of suitable locking portions adapted to engage the skirt of the holding member during application of the disc member thereto to prevent the disc plate from falling out. Such lugs may be formed in any suitable manner but, as illustrated herein, they are provided by bending outwardly the flange of the disc member, as shown at 17, at intervals about the periphery thereof. As illustrated herein, the flange is bent outwardly at four points in Fig. 2 and at eight points in Fig. 3, although it will be clear that any number of these may be used to effect the necessary results. In some cases, one such lug or holding member would be helpful but preferably three or more are desirable. The disc member, as constructed herein, has a normal external diameter, slightly less than the internal diameter of the holding member. By pressing outwardly the flange of the cap at intervals, as shown at 17, the external diameter of the disc at these points becomes greater than the internal diameter of the holding member. The effective internal diameter is determined by the inner surface of the thread of the cap. The distance between the thread and the cover part of the cap varies at different points about the periphery of the cap. Because of this distance, the disc is able to tilt, which reduces its effective diameter. This can be minimized by increasing the number of lugs. Eight lugs have been found to give excellent results.

In the assembly of the disc members and caps, they are forced into the holding members and the parts of the flange are bent inwardly slightly but, due to their resiliency, spring back and, when they pass the threaded portions 11 of the holding member, they expand to a point where they will not fall out because the holding members engage the thread on the downward movement of the disc. Therefore, when the cap is applied to a container, if the disc member is applied by vacuum prior to the application of the holding member, the holding member may be telescoped over the disc member because the portion 17 will give sufficiently to permit this. Generally, however, the disc and holding members are applied together. When the holding member is unscrewed to release the disc, the disc, being held on by vacuum, will remain on the container. By unscrewing the holding member, the projections 17 will follow around the threads and the holding member will be screwed off the disc member just as it is screwed off the container. The flexible members 17 form members which act more or less as the threads on the container, in so far as removal is concerned.

In addition, to the functions described hereinbefore, the lugs 17 serve to accurately center the disc with respect to the holding member and to the container. The rubber sealing ring is properly centered on the container and a better seal results. The centering of the disc makes it possible to reduce the width of the rubber ring without affecting the seal.

The shape of the lugs 17 may be varied within limits but, preferably, the flange is bent outwardly for a relatively short distance at intervals and preferably the entire flange is bent, that is, the otward flare at this part of the flange begins at the junction of the cover portion and flange. The construction and operation of the flange and holding member are clearly shown in Figs. 1 to 5. A slightly different form of holding projection is shown at 18, in Fig. 6. The construction in this figure differs from that shown in the other figures in that the projection is slightly arcuate in curvature. In other words, the central part of the projection does not extend outwardly as far as the end portions of each projection. In this way, the projection conforms substantially to the corrugations in the upper part of the cap and is adapted to fit in the cap better and, in some cases, to co-operate better with such corrugations.

In Fig. 4, the disc is illustrated as it is about to be inserted into a cap and after it has been inserted into the cap. In Figs. 7 and 8, a stack of discs is illustrated. It will be noted that the outwardly extending portions 17, due to the fact that the flare begins at the cover portion of the skirt, prevent the successive disc plates from nesting closely with each other and hold the cover portion of a cap spaced slightly from the gasket in the disc beneath. The advantage of the discs being thus nested is that the discs may be readily removed from each other and adhesion of adjacent disc members is prevented. It will be understood that when the disc members are stacked one upon another, the chance of the respective holding projections 17 being one upon another is slight and, therefore, these holding projections on one disc will engage the normal part of the flange on another and form what might be called shelves, which hold them apart.

In the operation of the preferred embodiment, the caps and disc members may be assembled by the cap manufacturers and shipped in assembled condition without danger of the disc members falling out during shipment. In such cases, where it is desirable to apply the disc members to the containers independently of the closure caps in order to simplify the machinery for vacuumizing the containers, the disc members may be handled or shipped in stacks and the holding projections 17 will prevent close nesting of the parts and will also prevent adherence of the sealing material to adjoining caps. In releasing the cap, the holding member may be unscrewed and the lugs 17 on the disc member will follow the screw threads of the cap as it is being unscrewed and the holding member may be removed without distorting in any way the disc member and the disc member may thereafter be used as a cover part for the container or it may be assembled with the holding member and the two used together for reseal purposes.

It will be seen that a construction has been provided in which a two-piece screw cap is provided, the parts of which will not fall out or become disarranged during shipment, handling, or application to containers. The parts of the cap can readily be assembled by automatic machinery in the cap manufacturers' plant and packers are not bothered with having to reassemble a substantial part of them at the packing plants. The lugs on the disc members are formed during the stamping operations and, hence, do not increase the cost of the disc members or of the assembled caps. The cost of changing the dies is slight and, therefore, the invention can be adopted by various cap manufacturers at a minimum cost. In addition to preventing disassembly of the disc members, the lugs serve to center the discs and to minimize the amount of sealing material required for an effective seal.

As various changes may be made in the form, construction, and arrangement of parts without departing from the spirit and scope of the invention and without sacrificing its advantages, it is to be understood that all matter herein is to be interpreted as illustrative and not in a limiting sense.

Having thus described my invention, I claim:

1. As an article of manufacture, a two-piece screw cap comprising a removable disc member having a depending skirt of substantially uniform depth, a screw member adapted to fit over said disc member to hold it on a container, said screw member having an annular corrugated zone at the upper part thereof, the flange of said disc member being struck radially outwardly at intervals to increase the diameter thereof and to fit against said corrugations to hold the disc member in place when said disc member is assembled with said screw member.

2. As an article of manufacture, a two-piece screw cap comprising a band member having a depending skirt and cover portion, the central part of said cover portion being removed, an annular corrugated zone at the upper part of said skirt, thread engaging means below said corrugation, said thread engaging means extending inwardly further than said corrugated zone, and a disc member in said cap having a flange thereon pressed radially outwardly at intervals to resiliently engage said skirt to prevent the disc member from falling out of the band member.

3. As an article of manufacture, the combination of a threaded holding member adapted to hold a disc member on a container, a disc member adapted to fit in said holding member, a narrow continuous flange on said disc member of substantial uniform length, said flange being struck outwardly at intervals to retain the disc in the upper part of said holding member whereby said members may be assembled and the disc member will not fall out, said outstruck portions being relatively short as compared with the intermediate portions.

4. As an article of manufacture, a disc member for screw closure caps and the like, comprising a cover portion, a short continuous depending flange, and sealing material in said disc portion adjacent said flange, said flange being pressed outwardly to form projections extending outwardly therefrom, said projections being curved inwardly between the ends thereof to co-operate with suitable corrugations in the skirt of a screw cap.

5. As an article of manufacture, a disc member for closure cap and the like, having a cover portion and a continuous depending flange of substantially uniform depth, portions of said flange being pressed outwardly at intervals to provide resilient holding projections, the circumferential length of said outwardly pressed portions being relatively short as compared with the length of the intermediate portions of the flange, said projections merging with said cover part and inclined outwardly therefrom.

6. A two-piece closure cap comprising a disc member and a holding member having a skirt portion provided with a continuous screw thread extending further radially inward than the lower edge of the skirt and a cylindrical zone above said screw thread for receiving said disc, said disc having a depending flange provided at intervals with outwardly extending relatively short projections adapted to increase the diameter of said disc member, said projections being resilient so that they may be forced past the screw thread and into the cylindrical zone, the increased diameter of the lower edge of the skirt facilitating entry of the projections into the band member, and the short length of said projections facilitating application and removal of the disc from the holding member.

7. A closure cap comprising a screw band and a disc member adapted to be assembled in said band, said disc member having a cover part and a continuous depending flange of substantially uniform depth and peripheral projections formed in the flange, said projections being relatively short with respect to the length of the intervening normal portions of the flange, said projections being inclined radially outwardly from the cover part beyond the normal portions of the flange to provide means for engaging the screw band to hold the disc therein.

8. A closure cap comprising the combination of a holding member having a flange with inwardly extending screw threads for engaging the thread of a container, and an annular portion above the screw thread forming an annular recess, a disc member adapted to be assembled with said screw member and to be seated in said recess, said disc member having a cover part and a continuous depending flange of substantially uniform depth and peripheral projections formed in the flange, said projections being relatively short with respect to the intervening normal portions of the flange, said projections extending outwardly beyond the normal portions of the flange to provide means for engaging the screw member to prevent the disc from falling out of said recess and said screw member.

JOHN C. GIBBS.